UNITED STATES PATENT OFFICE 2,618,641

ARYLIDENE-BIS-PYRAZOLONES

Arnold Weissberger and Paul W. Vittum, Rochester, N. Y., assignors to Eastman Kodak Company, Rochester, N. Y., a corporation of New Jersey No Drawing. Application December 15, 1951, Serial No. 261,913

9 Claims. (Cl. 260—310)

This invention relates to the preparation of arylidene-bis-pyrazolones made by the condensation of aromatic aldehydes with 5-pyrazolones.

The compounds of the present invention grow out of a need in color photography for pyrazolone coupler compounds which will couple rapidly with the oxidation products of primary aromatic amino silver halide developing agents to give dyes having the desired light absorption characteristics and stability to light, heat and moisture under the conditions to which photographic products are ordinarily subjected.

Bis-pyrazolones of various types have previously been proposed as coupler compounds for color photography. The bis-pyrazolone compounds of our invention possess improved coupling ability and stability compared with bis-pyrazolone compounds previously proposed.

The compounds of the invention have the following general formula:

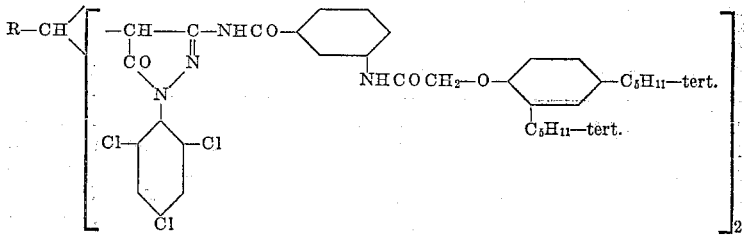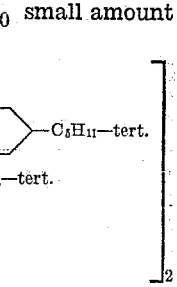

in which R represents an aryl group of the benzene series substituted or not with groups such as alkoxy or alkyl preferably of from 1 to 4 carbon atoms, halogen; for example, 3-methoxy-4-hydroxy-, 3,5-dimethoxy-, 4-hydroxy-, 4-chloro-, 2-chloro-, 4-methoxy-, 4-nitro-, and 4-hydroxy phenyl groups. Of this group of bis-pyrazolone compounds, the compound having the above general formula in which R is a 4-methoxy phenyl group (compound VI following) is exceptional in that it exhibits much better coupling ability and the magenta dye images obtained therefrom during color development processes are more stable than the dye images obtained from the other bis-pyrazolone compounds of the invention. Bis-pyrazolone compounds containing less than three chlorine groups attached to the 1-phenyl group of the pyrazolone nucleus possess inferior properties, particularly with regard to stability and light absorption characteristics of dye images obtained therefrom.

Representative compounds contemplated by our invention are prepared as shown in the following examples.

1 -(s - Trichlorophenyl) - 3 - [3' - (2'',4''- di-t. amylphenoxyacetamido) benzamido] - 5-pyrazolone (I)

This pyrazolone used in the synthesis of the bis-pyrazolones of the invention was prepared as follows:

2,4,6-Trichloroaniline was diazotized and the cold solution of diazonium salt was added to a cold sodium sulfite solution. The mixture was warmed to 60° C. for 30 minutes and was then acidified with concentrated hydrochloric acid. The reaction mixture was then heated overnight on the steam bath. The 2,4,6-trichlorophenylhydrazine was obtained by adding concentrated hydrochloric acid to the hot solution. The hydrochloride was converted to the free base and was added to boiling chlorobenzene, then ethyl-β-ethoxy-β-imino propionate was added and a small amount of glacial acetic acid was added as a catalyst. The mixture was refluxed for five minutes and was then cooled overnight at 0 to 5° C. The crystals of the hydrazine imino propionate were filtered off and washed with cold chlorobenzene and petroleum ether.

A solution of sodium ethoxide was prepared and to this was added the ethyl-(2,4,6-trichlorophenyl)hydrazino-β-imino propionate prepared above. The mixture was refluxed for 15 to 20 minutes, cooled to 50° C., diluted with water and esterified with glacial acetic acid. 1-(2',4'6'-trichlorophenyl)-3-amino-5-pyrazolone separated and this mixture was cooled, filtered and the product washed with water and dried.

The 1 - (2',4',6' - trichlorophenyl) - 3 - amino-5-pyrazolone (50 grams) was dissolved in dry pyridine and placed in a round-bottomed flask together with 625 cc. of glacial acetic acid and 67 grams of m-nitrobenzoyl chloride. The mixture was heated to boiling and refluxed for 30 minutes. A clear solution was formed and the product quickly separated out of solution. The reaction mixture was cooled, filtered and the product washed with alcohol and ether. The diacyl derivative obtained was suspended in 70% ethyl alcohol and heated to 70° C. and 40% caustic solution was stirred into the mixture. After stirring for 60 seconds, the mixture was acidified with glacial acetic acid. The monoacyl product separated at once and the slurry was stirred and cooled to room temperature. The product was filtered, washed with 200 cc. of ethyl alcohol, and 200 cc. of ether and dried at 100° C. This formed the m-nitrobenzamido derivative and 53 grams of this derivative was placed in a round-bottomed flask with 1325 cc. of 90% acetic acid. The mixture was heated to boiling and 53 grams of iron powder were added. The charge was refluxed for 15 minutes or until all of the nitro compound had dissolved. The solution was then filtered and stirred into two liters of boiling water. This mixture was heated to boiling, cooled to room temperature and filtered. The 1 - (2',4',6' - trichlorophenyl) - 3 - (3'-aminobenzamido)-5-pyrazolone obtained was washed with 200 cc. of ethyl alcohol, then with 200 cc. of ether and dried at 100° C. This product was then reacted with 2,4-di-tert.-amylphenoxyacetyl chloride to form the final product which was found to have a melting point of 138 to 139° C.

The following eight representative benzylidene-bispyrazolones (II–IX) are all derived from the same parent coupler (I) by the following procedure.

1 - (s - Trichlorophenyl) - 3 - [3'-(2'',4''-di-t.-amylphenoxy-acetamido) benzamido] - 5 - pyrazolone (I) (672 grams, one mole) is dissolved in 2.5 l. of ethyl alcohol by warming. To this solution is added 0.50 mole of the appropriate benzaldehyde and the resulting solution is heated at 70–750 for one hour. The product precipitates from the hot solution. The mixture is cooled, the solid is separated from the liquor and washed with cold ethyl alcohol. The crude benzylidene-bis-pyrazolones are crystallized from 8 to 20 parts of ethyl acetate and/or acetonitrile.

| | M. P. ° C. | Yield, Percent | Analysis Calc. | Analysis Found | R= |
|---|---|---|---|---|---|
| (II) 4,4'Syringylidene-bis-1-(s-trichloro-phenyl)-3-[3'-(2'',4''-diamyl-phenoxy-acetamido)-benzamido]-5-pyrazolone. | 170–171 | 79 | Cl 14.1<br>N 7.4 | 14.5<br>7.4 | Syringyl. |
| (III) 4,4'Vanillylidene-bis-1-(s-trichlorophenyl)-3-[3'-(2'',4''-diamylphenoxy-acetamido)-benzamido]-5-pyrazolone. | 195–196 | 83 | C 61.3<br>H 5.5 | 61.5<br>5.3 | Vanillyl. |
| (IV) 4,4'-p-Chlorobenzylidene-bis-1-(s-trichlorophenyl)-3-[3'-(2'',4''-diamyl-phenoxyacetamido)-benzamido]-5-pyrazolone. | 203–204 | 88 | Cl 16.8 | 17.2 | p-chlorophenyl. |
| (V) 4,4'-o-Chlorobenzylidene-bis-1-(s-trichlorophenyl)-3-[3'-(2'',4''-di-amylphenoxy-acetamido)-benzamido]-5-pyrazolone. | 218–219 | 96 | Cl 16.8 | 17.3 | o-chlorophenyl. |
| (VI) 4,4'-p-Methoxybenzylidene-bis-1-(s-trichlorophenyl)-3-[3'-(2'',4''-diamylphenoxy-acetamido)-benzamido]-5-pyrazolone. | 215 | 96 | C 62.4<br>H 5.5 | 62.5<br>5.5 | p-methoxy-phenyl. |
| (VII) 4,4'-p-Nitro-benzylidene-bis-1-(s-trichlorophenyl)-3-[3'-(2'',4''-diamylphenoxy-acetamido)-benzamido]-5-pyrazolone:<br>before recryst<br>after recryst | <br><br>199–201<br>192–193 | <br><br><br>90 | <br><br><br>C 61.2<br>H 5.2 | <br><br><br>60.8<br>5.2 | p-nitrophenyl. |
| (VIII) 4,4'-p-Hydroxybenzylidene-bis-1-(s-trichlorophenyl)-3-[3'-(2'',4''-diamylphenoxy-acetamido)-benzamido]-5-pyrazolone:<br>before recryst<br>after recryst | <br><br>187–188<br>173–174 | <br><br><br>84 | <br><br><br>C 62.5<br>H 5.4 | <br><br><br>62.3<br>5.4 | p-hydroxyphenyl. |
| (IX) 4,4'-Benzylidene-bis-1-(s-trichlorophenyl)-3-[3'-(2'',4''-di-t.-amyl-phenoxyacetamido)-benzamido]-5-pyrazolone:<br>before recryst<br>after recryst | <br><br>188–193<br>170–172 | <br><br><br>73 | <br><br><br>C 62.7<br>H 5.4 | <br><br><br>63.1<br>5.3 | phenyl. |

From the above description of the method of preparation of the compounds of the invention, it is apparent that compounds II–IX are obtained by reaction of I with the aldehydes; syringaldehyde, vanillaldehyde, p-chloro, o-chloro-, p-methoxy-, p-nitro-, p-hydroxybenzaldehyde and benzaldehyde, respectively. R in the above tabulation corresponds to R of the above general formula. Other benzaldehydes useful in preparing the arylidene-bis-pyrazolones of our invention as described will occur to those skilled in the art.

As mentioned previously, the compounds having the general formula above in which R is an alkoxy phenyl group, particularly a 4-methoxy phenyl group, are of outstanding value.

What we claim is:

1. A compound having the following general formula:

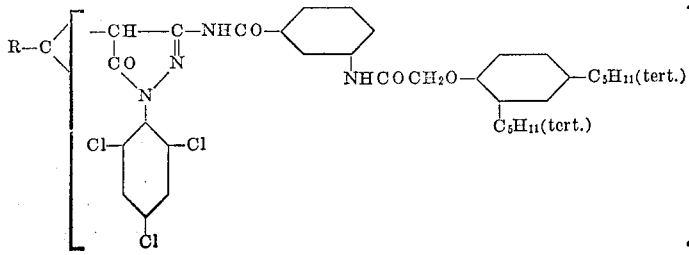

wherein R represents a mononuclear aryl group.

2. A compound having the formula set forth in Claim 1 in which R represents a methoxy phenyl group.

3. A compound having the formula set forth in Claim 1 in which R represents a p-methoxyphenyl group.

4. A compound having the formula set forth in Claim 1 in which R represents a halogenated phenyl group.

5. A compound having the formula set forth in Claim 1 in which R represents a p-chlorophenyl group.

6. A compound having the formula set forth in Claim 1 in which R represents a nitrophenyl group.

7. A compound having the formula set forth in Claim 1 in which R represents a hydroxyphenyl group.

8. A compound having the formula set forth in Claim 1 in which R represents a p-nitrophenyl group.

9. A compound having the formula set forth in Claim 1 in which R represents a p-hydroxyphenyl group.

ARNOLD WEISSBERGER.
PAUL W. VITTUM.

REFERENCES CITED

The following references are of record in the file of this patent:

UNITED STATES PATENTS

| Number | Name | Date |
|---|---|---|
| 2,511,231 | Weissberger et al. | June 13, 1950 |

FOREIGN PATENTS

| Number | Country | Date |
|---|---|---|
| 599,919 | Great Britain | Mar. 24, 1948 |

OTHER REFERENCES

Vittum et al.: Abstract of Serial No. 668,778; published Feb. 7, 1950.